United States Patent [19]

Suzuki

[11] Patent Number: 4,675,696
[45] Date of Patent: Jun. 23, 1987

[54] RECORDING APPARATUS

[75] Inventor: Hidetoshi Suzuki, Tokyo, Japan

[73] Assignee: Canon Kabushiki Kaisha, Tokyo, Japan

[21] Appl. No.: 480,333

[22] Filed: Mar. 30, 1983

[30] Foreign Application Priority Data

| Apr. 7, 1982 [JP] | Japan | 57-56740 |
| Apr. 7, 1982 [JP] | Japan | 57-56741 |
| Apr. 7, 1982 [JP] | Japan | 57-56742 |

[51] Int. Cl.$^4$ .............. G01D 9/28; G01D 18/00; H04N 1/46
[52] U.S. Cl. .................. 346/46; 346/140 R; 346/75; 358/75; 358/78; 358/296
[58] Field of Search ............ 346/1.1, 75, 140 R, 346/46; 358/75, 296, 78

[56] References Cited

U.S. PATENT DOCUMENTS

| 3,886,564 | 5/1975 | Naylor et al. | 346/75 |
| 4,169,285 | 9/1979 | Walker | 346/518 X |
| 4,313,684 | 2/1982 | Tazaki et al. | 400/322 X |
| 4,328,504 | 5/1982 | Weber et al. | 346/75 |
| 4,344,078 | 8/1982 | Houston | 346/75 |
| 4,376,944 | 3/1983 | Reitberger et al. | 346/140 R |
| 4,403,874 | 9/1983 | Payne et al. | 400/124 X |
| 4,446,470 | 5/1984 | Sugiyama et al. | 346/140 R |

Primary Examiner—E. A. Goldberg
Assistant Examiner—Gerald E. Preston
Attorney, Agent, or Firm—Fitzpatrick, Cella, Harper & Scinto

[57] ABSTRACT

A recording apparatus with plural recording units, in which a detecting unit detects and corrects the aberration in the recording position by reading a reference pattern formed by the recording units. The recording apparatus is particularly suitable for recording a multicolor image.

9 Claims, 23 Drawing Figures

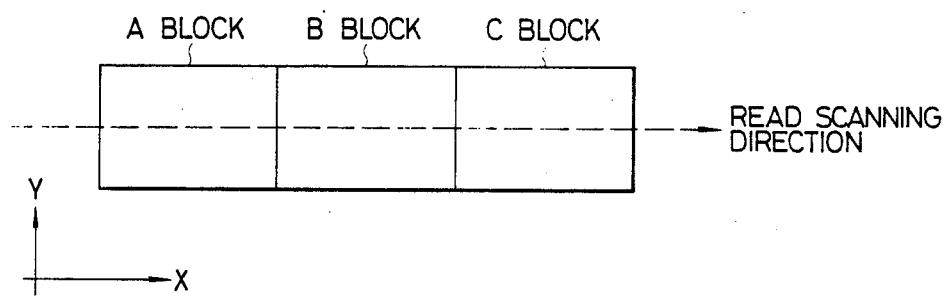
FIG. 4
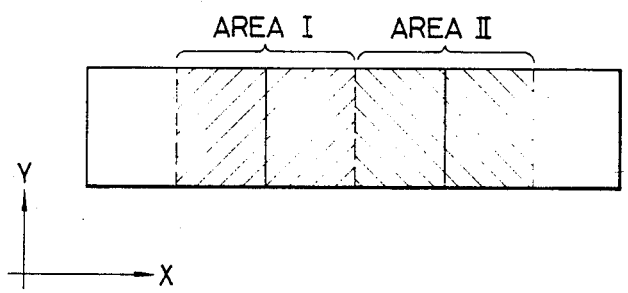
FIG. 5
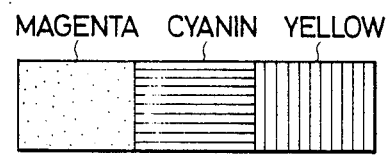
FIG. 6A
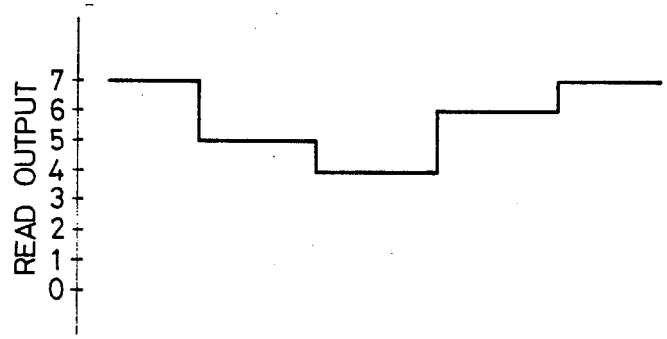

RECORDING APPARATUS

BACKGROUND OF THE INVENTION

1. Field of the Invention

The present invention relates to a recording apparatus capable of correcting aberration in the image recording or deterioration in the quality of the recorded image.

2. Description of the Prior Art

In a recording apparatus with plural recording means, for example a color ink jet printer with plural ink nozzles, recording of characters, patterns or other images is achieved by the emission of inks of plural colors respectively from plural ink nozzles for realizing subtractive color mixing. Consequently an aberration in the relative positioning of plural recording means, or of plural images recorded by said recording means, will lead to for example in a color ink jet printer, an aberrant intermediate tone or a deterioration in resolving power, thus giving rise to aberrant image recording or deteriorated quality in the recorded image. In such conventional recording apparatus, however, such relative positional aberration of the recording means can only be corrected empirically from the direction and extent of such aberration judged visually from the actually recorded image, which is at best obtained from a test chart. Such correcting procedure not only requires experience but also is time consuming and does not allow exact positioning of plural recording means since exact judgement of positional error is extremely difficult even for an experienced operator.

SUMMARY OF THE INVENTION

An object of the present invention is to provide a recording apparatus not associated with the above-mentioned drawbacks and thus capable of image recording with a high image quality.

Another object of the present invention is to provide a recording apparatus capable of automatically correcting relative positional aberration of plural recording means.

Still another object of the present invention is to provide a recording apparatus capable of detecting relative positional aberration of plural recording means by a reference pattern.

Still another object of the present invention is to provide a recording apparatus capable of correcting color aberration in a color image to be reproduced by recording means.

The above-mentioned and still other objects of the present invention will become fully apparent from the following description.

BRIEF DESCRIPTION OF THE DRAWINGS

FIG. 4 is a view of a reference pattern for detecting relative positional aberration of the recording means;

FIG. 5 is a view showing an example of the detecting area of the reference pattern by a sensor;

DETAILED DESCRIPTION OF THE PREFERRED EMBODIMENTS

Now the present invention will be clarified in detail by embodiments shown in the attached drawings. For the purpose of facilitating the understanding of the present invention, the embodiments shown in the following are those in which the present invention is applied to a color ink jet printer.

Figure 1:
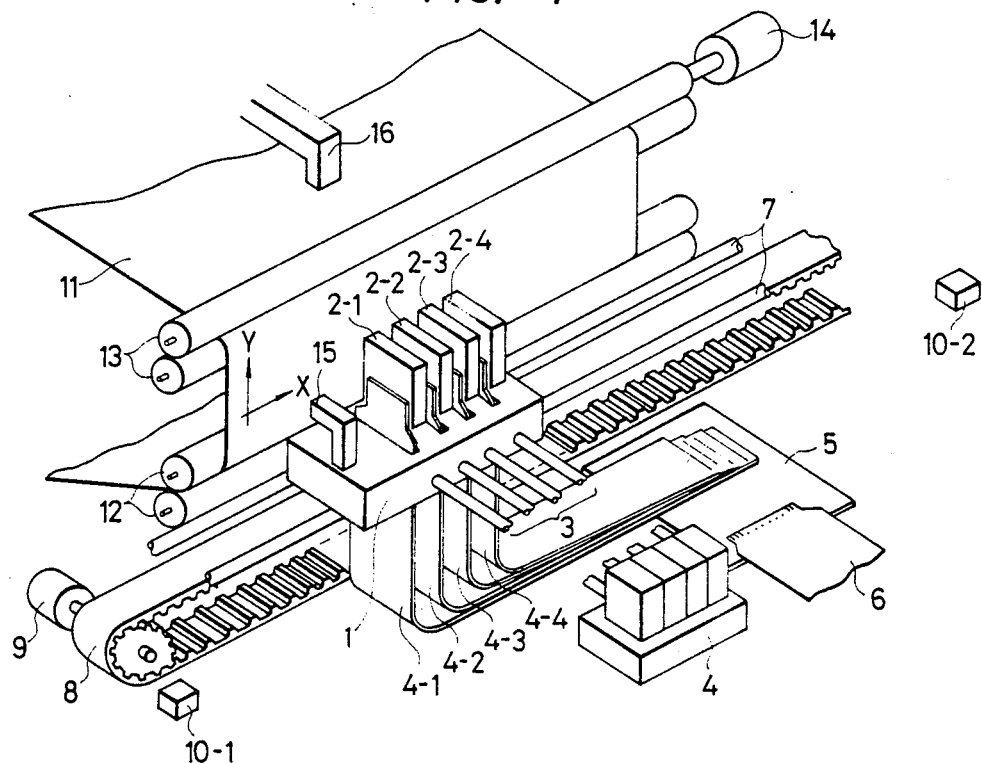
FIG. 1 is a perspective view of an ink jet printer embodying the present invention.

FIG. 1 is a schematic external view of a color ink jet printer embodying the present invention, wherein a carriage 1 is provided with first to fourth nozzle heads 2-1 to 2-4 arranged from left to right, which are respectively utilized for emitting inks of cyan (C) (also reference to herein as "cyanin"), magenta (M), yellow (Y) and black (K) colors supplied respectively from ink reservoirs 4 through flexible tubes 3. Said nozzle heads receive driving signals through respective flexible insulating belts 4-1-4-4 containing plural lead wires, a relay plate 5 and a united signal belt 6. Such carriage 1, supported by two rails 7, reciprocates in a direction X to perform main scanning by a stepping motor 9 through an endless belt 8, while a recording sheet 11 stretched between two pairs of rollers 12, 13 is driven by a stepping motor 14 connected to the paired rollers 13 in a direction Y to perform subsidiary scanning, whereby a color image is obtained on said recording sheet 11 by the color inks emitted from the nozzle heads 2-1-2-4. The range of said main scanning is defined by stoppers 10-1, 10-2 positioned on both ends of the running path of the carriage 1.

In addition to the above-described structure already known in the art, the color ink jet printer of the present invention is provided with a sensor 15 on the carriage 1 for scanning and detecting the image recorded by the nozzle heads 2-1-2-4 in the main scanning direction, and a sensor 16 positioned along said recording sheet but distant from the paired rollers 13 for scanning and detecting said recorded image.

Figure 2:
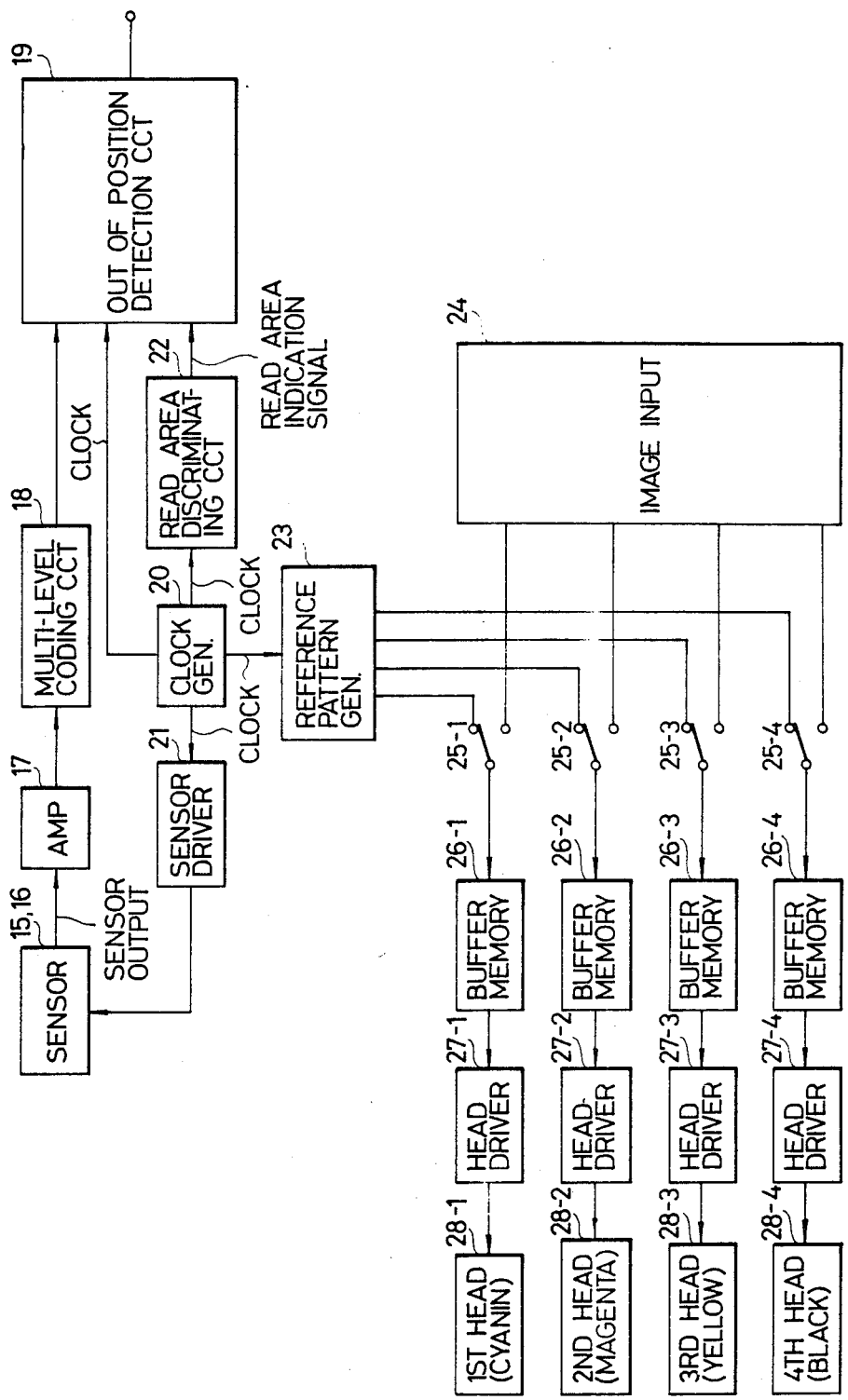
FIG. 2 is a block diagram of a driving circuit therefor.

FIG. 2 shows a circuit for use in the above-described color ink jet printer of the present invention capable of recording an image with the above-described structure and of detecting the relative positional aberration of the nozzle heads by detecting the position of the recorded images with the sensors. In said circuit, the sensors 15, 16 provided in the main and auxiliary scanning directions as shown in FIG. 1 are activated by a sensor driver circuit 21 driven by clock signals from a clock generator 20 to read the recorded image on the recording sheet 11, and the obtained image signals are supplied through an amplifier 17 to a multi-level encoding circuit 18 to obtain multi-level image signals, which are supplied to an out-of-position detecting circuit 19. Also a reading area discriminating circuit 22, for discriminating the reading area of the recorded image by counting the clock signal from the clock generator 20, supplies a reading area indicating signal to the out-of-position detecting circuit 19, thereby detecting the direction and magnitude of the relative positional aberration of the image respectively recorded by the nozzle heads 2-1-2-4 as will be explained in the following. For the purpose of such detection, a reference pattern generator 23, for forming a reference test pattern in response to the counting of the clock signals from the clock generator 20, generates reference pattern signals, which are temporarily stored in buffer memories 26-1-26-4 respectively through selector switches 25-1-25-4. Said signals are subsequently read at suitable timings and are supplied to head drivers 27-1-27-4 for driving first to fourth heads 28-1-28-4 corresponding to the nozzle heads 2-1-2-4 shown in FIG. 1 and respectively emitting inks of cyan, magenta, yellow and black colors, thereby recording reference patterns on the recording sheet 11 in a form to be explained later. According to the result of the detection of relative positional aberration of the reference patterns recorded in this manner, the heads 28-1-28-4 respectively receive the color image signals from an image input unit 24 through the switches 25-1-25-4 under the control of an electronic circuit to be explained later, thereby providing a multi-color image through the combination of color images without positional aberration.

The information on the relative positional aberration of the reference patterns obtained from the out-of-position detecting circuit 19 may be taken out from an output terminal and displayed in analog form as a reference patterns or as reference pattern waveform involving relative positional aberration, or in digital form as numerical data.

Now there will be given an explanation on the processing of detecting, by the sensor 15, the relative positional aberration of the nozzle heads 2-1-2-4 in the main scanning direction X.

Figure 3:
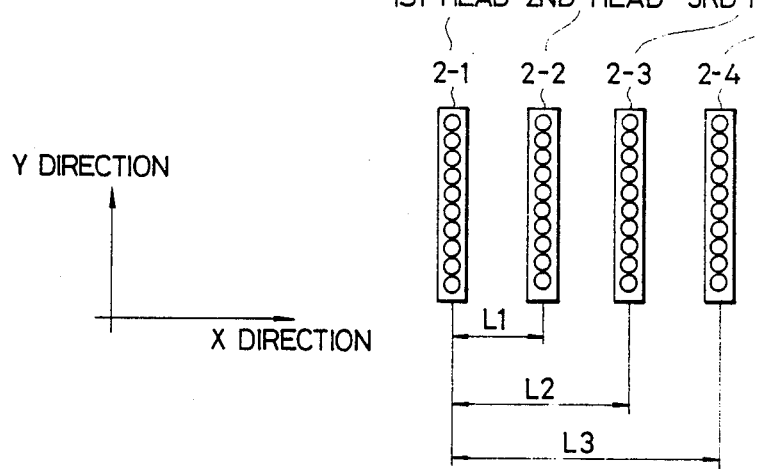
FIG. 3 is an elevation view showing the arrangement of recording means.

Each nozzle head of a color ink jet printer is, as shown in FIG. 3, generally composed of an array, for each color, of plural ink nozzles arranged in the subsidiary scanning direction Y, and image recording with a dot matrix process is achieved by repeating the simultaneous recording of plural dots of a single color with such nozzle array in the main scanning direction X while stepping the recording sheet 11 in the direction Y. In case of multi-color image recording with four colors, the first head 2-1 for cyan recording is positioned at the back, and the second, third and fourth heads 2-2, 2-3, 2-4 respectively for magenta, yellow and black recording are arranged in the direction X with distances L1, L2, L3 respectively from said first head 2-1. It is assumed that said distances L1, L2, L3 respectively have errors $\Delta L_n$ (n=1-3) which may be positive or negative in the direction X, so that the nozzle heads 2-2, 2-3, 2-4 are positioned respectively at distance L1+$\Delta L_1$, L2+$\Delta L_2$, L3+$\Delta L_3$ from the reference nozzle head 2-1. The positions of such heads can be detected, according to the present invention, in the following manner.

As shown in FIG. 4, the reference pattern to be employed in the detection of the relative positional aberration of the nozzles in the present invention can be composed of closely neighboring three blocks A, B, C, each having a determined width in the direction Y, for example a width corresponding to the length of the ink nozzle array shown in FIG. 3 and a determined length equal to the distance between the centers of three neighboring ink nozzle arrays in the direction X. Stated differently, in such reference pattern, the blocks A, B, C of different colors will be in exactly adjoining relationship by the running of three neighboring nozzle arrays in the direction X, if there exists no relative positional aberration in said arrays. The colors of the blocks A, B, C of said reference pattern may be arranged in the order of colors of the ink nozzles on the carriage 1, or may be arbitrarily inverted if the ink emissions from the nozzle arrays are controlled at suitable timings in consideration of the running speed of the carriage 1 and of the distances of said arrays.

The adjoining state of the blocks A, B, C of the reference pattern shown in FIG. 4 reflects the state of positional adjustment of the ink nozzle arrays on the carriage 1 and therefore allows to identify whether the relative positional relation of said nozzle arrays is appropriate or not. Consequently the sensor 15 positioned on the carriage 1 is designed to detect areas I and II around the boundaries of the blocks in the reference pattern shown in FIG. 4.

In response to the single-color images of cyan (C), magenta (M), yellow (Y) and black (K) formed by the ink nozzles arrays 2-1-2-4 positioned on the carriage 1, the sensor 15 provides the detection output levels shown in Tab. 1 corresponding to the luminosity of said images, wherein the normal white background of the recording sheet is taken as "level 7" and cyan image is positioned in the central block B of the reference pattern shown in FIG. 4 to provide subtractive color mixing when the neighboring blocks mutually overlap.

Tab. 1

| Block color | Sensor output level |
| --- | --- |
| Background (no recording) | 7 |
| Yellow | 6 |
| Magenta | 5 |
| Cyan | 4 |
| Cyan + Yellow | 3 |
| Cyan + Magenta | 2 |
| Black | 0 |
| Black + Cyan | 0 |

Consequently, in case the blocks A, B, C of the reference pattern shown in FIG. 4 respectively have magenta, cyan and yellow colors, and if the ink nozzle arrays 2-1-2-4 on the carriage 1 are mutually positioned correctly, the detection output levels of the sensor 15 corresponding to the recorded image of said reference pattern should show a change as shown in FIG. 6A along the displacement of the carriage.

Figure 6B:
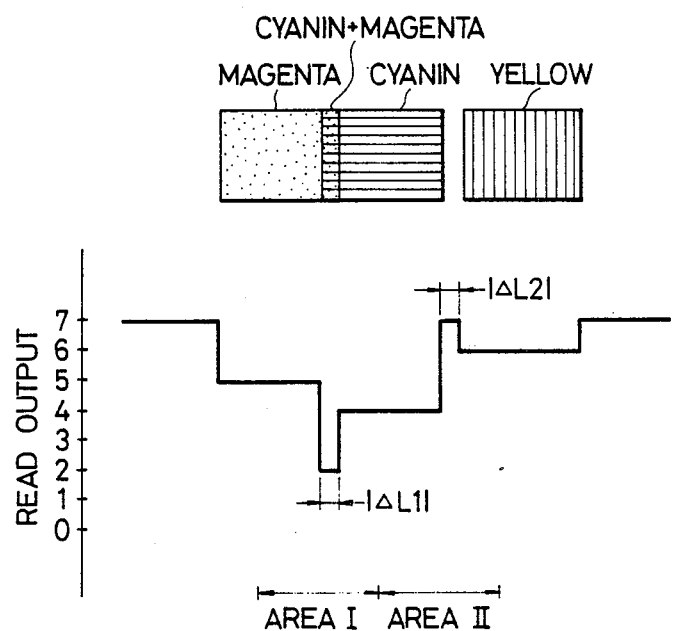
FIGS. 6 and 7 are views showing examples of detection of relative positional aberration by the reference pattern.

On the other hand, in case the first nozzle head 2-1 for the cyan color has a positional aberration with respect to the second and third nozzle heads 2-2, 2-3 for the magenta and yellow colors to create an overlapping between the blocks A and B and a gap between the block B and C, the detection output level of said sensor 15 shows a change shown in FIG. 6B with the displacement of the carriage. Consequently it is rendered possible to detect the errors $\Delta L_1$ and $\Delta L_2$ respectively in the head distances L1, L2 shown in FIG. 3. The change in the detection output level of said sensor 15 can be identified as multi-level encoded signals by the circuit shown in FIG. 2, and the magnitude of such aberration or error can be quantitatively detected by the count of clock signals.

Figure 7A:
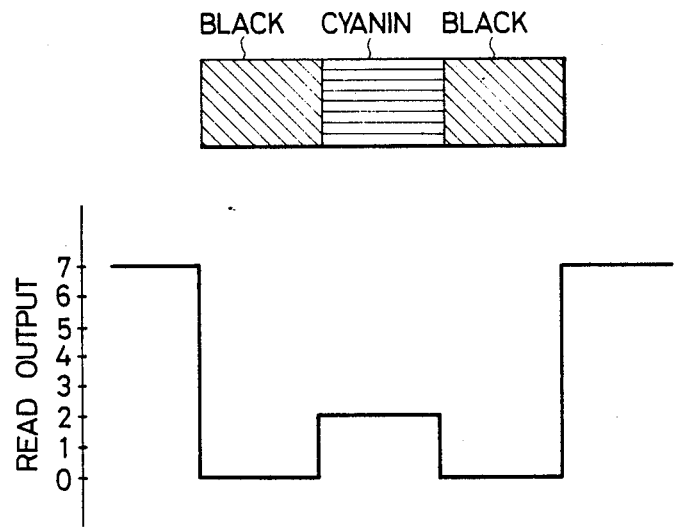
Figure 7B:
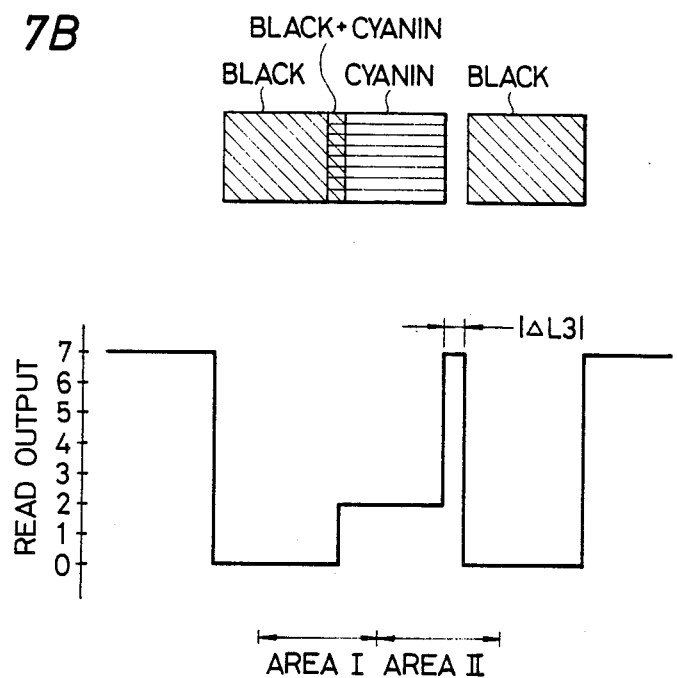

Also in case of discriminating the positional relationship between the first head 2-1 for the cyan color and the fourth head 2-4 for the black color, the timing of ink emission is appropriately controlled in such a manner that the central block B of the reference pattern in FIG. 4 has cyan color while the blocks A, C have black color. Thus, in the same manner as explained above in relation to FIGS. 6A and 6B, an appropriate relative position of the first and fourth heads 2-1, 2-4 will provide a detection output level shown in FIG. 7A from the sensor 15, while an aberrant relationship will provide an output level as shown in FIG. 7B. Consequently the direction and magnitude of such relative positional aberration can be detected quantitatively from the width of change in the detection output level. In case black color is used in any of the blocks in said reference pattern, it is necessary to place black blocks on both sides of a block of another color in order that a relative positional aberration in any direction can be identified from a gap between the blocks, since an overlapping between a black block and a block of another color does not create a change in the output level of the sensor 15.

Tab. 2 summarizes the relation between the detection level in the detection areas I, II shown in FIG. 5 and the positional aberration of the nozzle heads 2-2–2-4 with respect to the first nozzle head 2-1 for cyan color.

Tab. 2

| Positional aberration | (direction) | Detection area | Detection level |
| --- | --- | --- | --- |
| Second head (magenta) | +X | I | 7 |
|  | −X | I | 2 |
| Third head (yellow) | +X | II | 3 |
|  | −X | II | 7 |
| Fourth head (black) | +X | I | 7 |
|  | −X | II | 7 |

Figure 8:
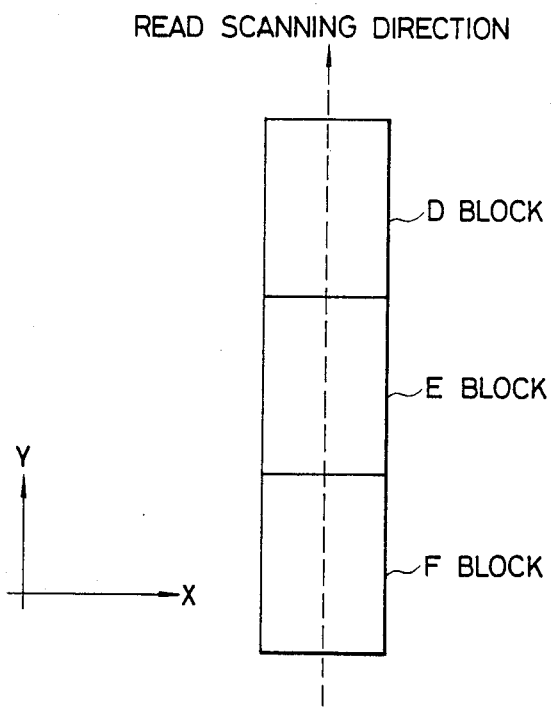
FIG. 8 is a view showing a reference pattern for detecting relative positional aberration of the recording means in the subsidiary scanning direction.

In the foregoing there has been explained the method of detecting the relative positional aberration of the nozzle heads in the main scanning direction X by means of the sensor 15 positioned on the carriage 1 and running in said direction X, but the relative positional aberration of the nozzle heads 2-1–2-4 in the subsidiary scanning direction Y can also be achieved in a similar manner by means of the sensor 16 shown in FIG. 1 and of a reference pattern composed, as shown in FIG. 8, of three blocks D, E, F closely adjoining in the subsidiary scanning direction Y.

Also the reference pattern for detecting the relative positional aberration of the nozzle heads, which is in the foregoing explanation composed of closely adjoining three blocks of different colors, is not limited to such form for the purpose of the present invention but can be modified in various manners. As an example, a reference pattern of the same form as shown in FIG. 4 but composed of a same colored blocks can be utilized for detecting the relative positional aberration of the nozzle heads for a same color through a loss in the detection level of the sensor caused by an overlapping between neighboring blocks and an increase in said detection level caused by a gap between neighboring blocks.

Figure 9A:
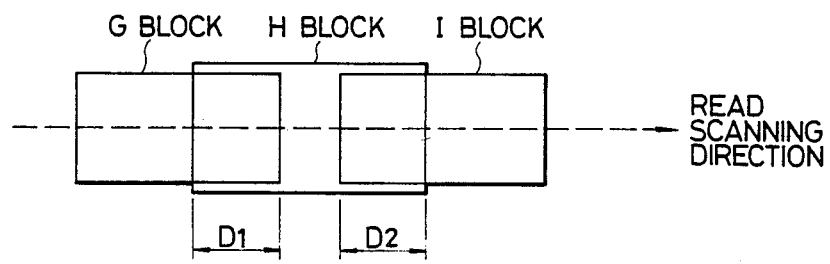
FIG. 9 is a view showing another example of the reference pattern.
Figure 9B:
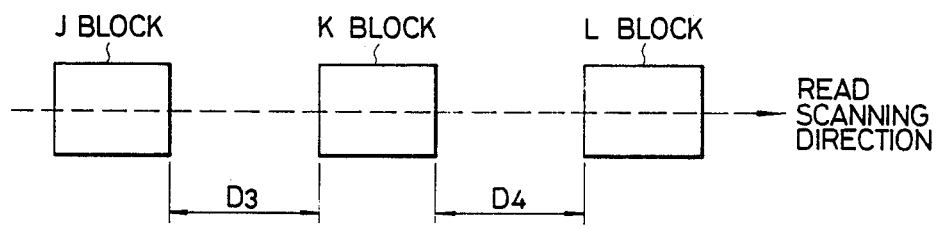

Also the reference pattern may be composed, as shown in FIG. 9A, of three blocks G, H, I mutually overlapping with determined widths D1, D2 in the main scanning direction X, or, as shown in FIG. 9B, of three blocks J, K, L mutually separated by determined gaps D3, D4 in the X direction. In such cases the relative positional aberration of the nozzle heads can be identified by detecting and comparing said values D1, D2 or D3, D4 with determined reference values. In more general manner, the reference pattern for detecting the relative positional aberration of the nozzle heads for use in the present invention can be composed of patterns, marks or characters of arbitrary shape as long as such pattern has determined widths respectively in the main scanning direction X and in the subsidiary scanning direction Y, which can be quantitatively determined by the count of clock signals for determining the direction and magnitude of said relative positional aberration.

Also the sensor utilized for detecting the relative positional aberration of the nozzle heads need not be composed of independent sensors functioning in the main scanning direction X and in the subsidiary scanning direction Y as explained in the foregoing, but can be composed of an area sensor capable of reading the recorded image in an appropriate area.

As explained in the foregoing, it is rendered possible, based on the above-described principle, to easily and quantitatively detect the relatively positional aberration of the plural recording means provided in a recording apparatus such as a color ink jet printer, thereby determining the direction and magnitude of such aberration, and, and to correct the relative position of said recording means in manual or automatic manner in response to the result of such detection, thereby enabling image recording of high image quality without positional color aberration. It is also possible to display such relative positional aberration.

Now there will be explained an embodiment in which the relative position of the recording means is controlled in response to the result of detection of the relative positional aberration. In the following there will be explained an electronic circuit for correcting the relative position of four nozzle heads in response to the detection of relative positional aberration by a sensor in reference patterns composed of four images recorded by said nozzle heads, but, for the purpose of simplicity, it is assumed that the correction is applied only to the first and second nozzle heads in response to two recorded images.

Figure 10A:
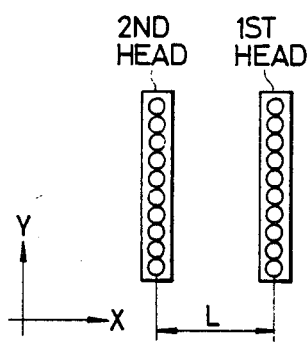
FIG. 10 is a view showing various modes of relative positional aberration of the recording means.
Figure 10B:
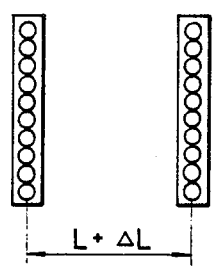
Figure 10C:
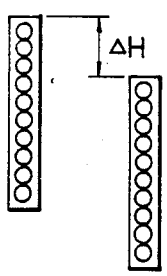
Figure 11A:
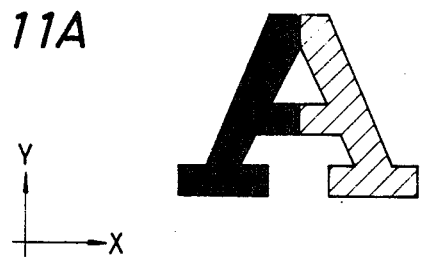
FIG. 11 is a view showing various modes of relative positional aberration of the recorded image.
Figure 11B:
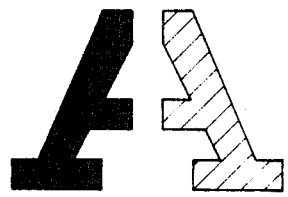
Figure 11C:
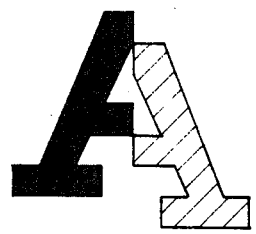

It is assumed that, as shown in FIG. 10A, first and second nozzle arrays extending in the direction Y are positioned in parallel manner with a mutual distance L to recording the right-hand half and left-hand half of a pattern shown in Fig. 11A. Thus an aberration ΔL in the direction X or an aberration ΔH in the direction Y as shown in FIGS. 10B and 10C will result in a gap or an overlapping of said halves in the direction X or Y as shown in FIGS. 11B and 11C.

Figure 12:
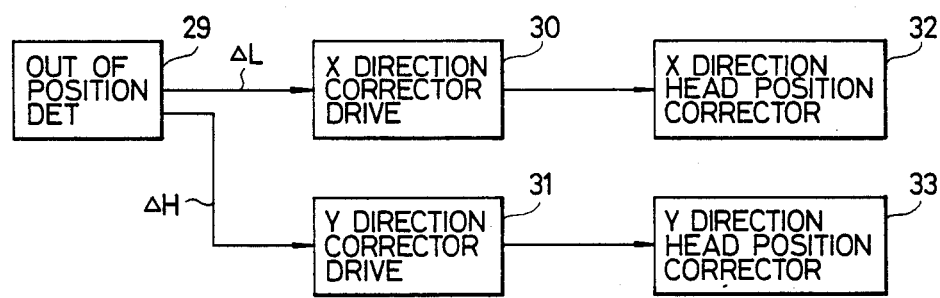
FIG. 12 is a block diagram of a circuit for correcting relative positional aberration of the recording means.

For compensating such relative positional aberration, the recording apparatus of the present invention is provided with a nozzle head position correcting circuit as shown in FIG. 12. In said circuit, an X-direction out-of-position signal (ΔL) and a Y-direction out-of-position signal (ΔH) obtained from the out-of-position detector 29 explained above are supplied, respectively through an X-direction correcting driver 30 and a Y-direction correcting driver 31, to an X-direction head position corrector 32 and a Y-direction head position corrector 33, thereby correcting the relative positioning of the nozzle heads 2-1–2-4 provided on the carriage 1 shown in FIG. 1.

Figure 13:
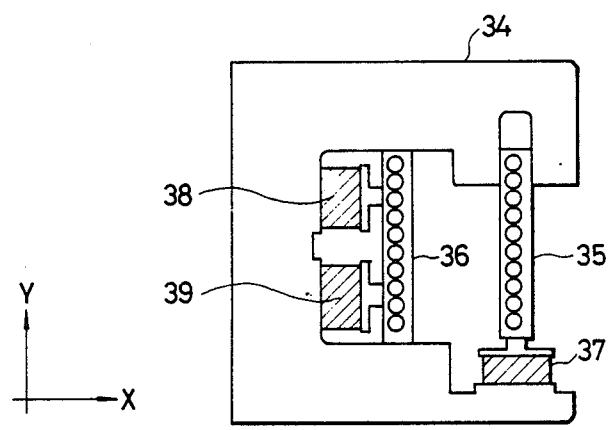
FIGS. 13 and 14 are views showing the structure of a position corrector for the recording means.

With respect to the first and second heads, the head position correctors 32, 33 mechanically correct the relative position of the head in the directions X and Y for example by a structure shown in FIG. 13. Such correction of relative position is basically applicable to other combinations of the nozzle heads.

Referring to FIG. 13, a head support member 34 slidably supports the first nozzle head 35 in the direction Y and slidably supports the second nozzle head 36 in the direction X, wherein said first nozzle head 35 is provided at the lower end thereof with a piezoelectric element 37 capable of expanding and shrinking in the direction Y, while the second nozzle head 36 is provided, at a lateral edge thereof, with piezoelectric elements 38, 39 capable of expanding and shrinking in the direction X. Such head position corrector performs the role of the X- and Y-direction head position correctors 32, 33 shown in FIG. 12, wherein a voltage corresponding to the X-direction out-of-position signal ΔL is applied to said piezoelectric elements 38, 39 to move the second head 36 in the direction X thereby correcting the distance or relative position between the first and second nozzle heads 35, 36 in the direction X, while a voltage corresponding to the Y-direction out-of-position signal ΔH is applied to said piezoelectric element 37 to move the first head 35 in the direction Y thereby removing the relative positional aberration of the first and second nozzle heads 35, 36 in the direction Y.

Figure 14:
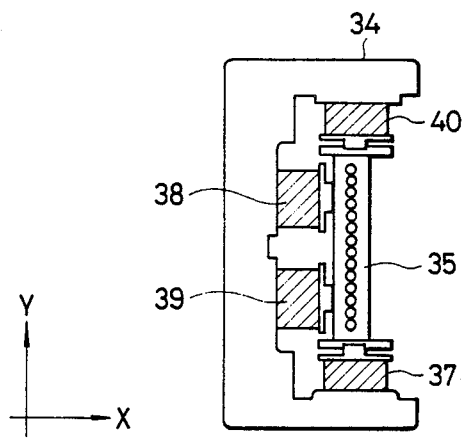

FIG. 14 shows another embodiment of the head position corrector, which is applicable to any of the plural nozzle heads 2-1-2-4 positioned on the carriage 1 as shown in FIG. 1, and is still capable of positional adjustment both in the direction X and in the direction Y. In this embodiment, the nozzle head 35 is provided, along a lateral edge thereof, with piezoelectric elements 38, 39 capable of expanding and shrinking in the direction X to achieve positional correction in the direction X in the same manner as shown in FIG. 13, and is further provided, at the upper and lower ends of said nozzle head, with piezoelectric elements 40, 37 capable of expanding and shrinking in the direction Y, which, in response to mutually inverted voltages corresponding to the Y-direction out-of-position signal ΔH, differentially moves the nozzle head 35 in the direction Y. Consequently a nozzle head unit in which the relative relationship between arbitrary nozzle heads can be corrected in both directions X and Y can be obtained by arranging, on the carriage 1, a desired number of such unit nozzle head of the above-described structure with a determined distances.

The sliding displacement of the nozzle head, achieved by the control of voltages supplied to the piezoelectric elements in the embodiment shown in FIGS. 13 and 14, can also be achieved by small stepping in the directions X, Y for example with small stepping motors.

Also the plural recording means subjected to the above-described detection and correction of relative positional aberration need not be limited to the ink nozzle heads described above but may be any other recording means, and the number of such recording means can be arbitrarily selected.

Now there will be explained an embodiment in which the detected relative positional aberration of the recording means is compensated by a delay control at the image recording.

Figure 15:
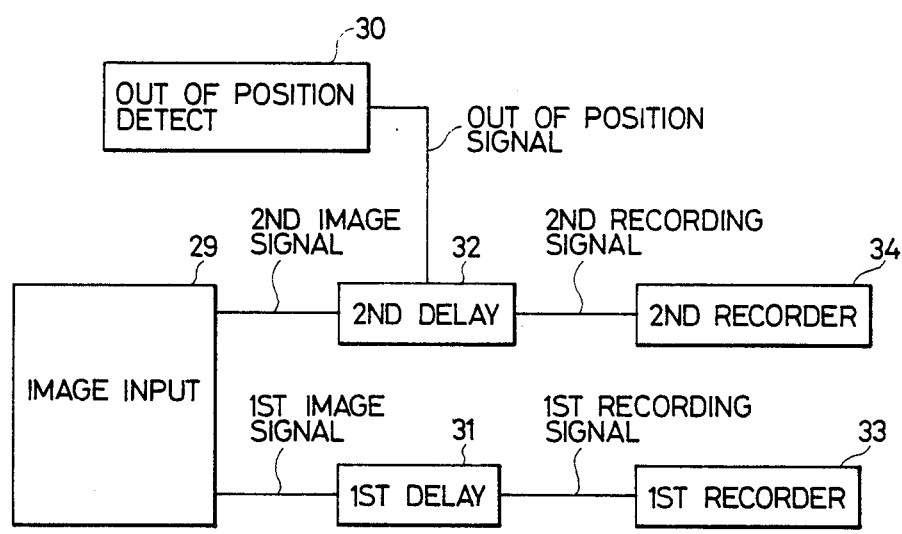
FIG. 15 is a block diagram showing an image recording control circuit.

FIG. 15 shows an embodiment of an image recording control circuit capable of automatically correcting the relative aberration between the first and second nozzle heads as described above or between two images recorded by such nozzle heads. In the illustrated circuit, an image input unit supplies first and second appropriate color image signals respectively through first and second delay units 31, 32 to first and second recorders 33, 34 thereby obtaining a desired synthesized image through respective image recording of the recording means such as the ink nozzles described before, and the aforementioned out-of-position signal from the out-of-position detecting unit 30 is supplied to the second delay unit 32 to dissipate the detected positional aberration with respect to the first recording signal appropriately delayed by the first delay unit 31.

Figure 16:
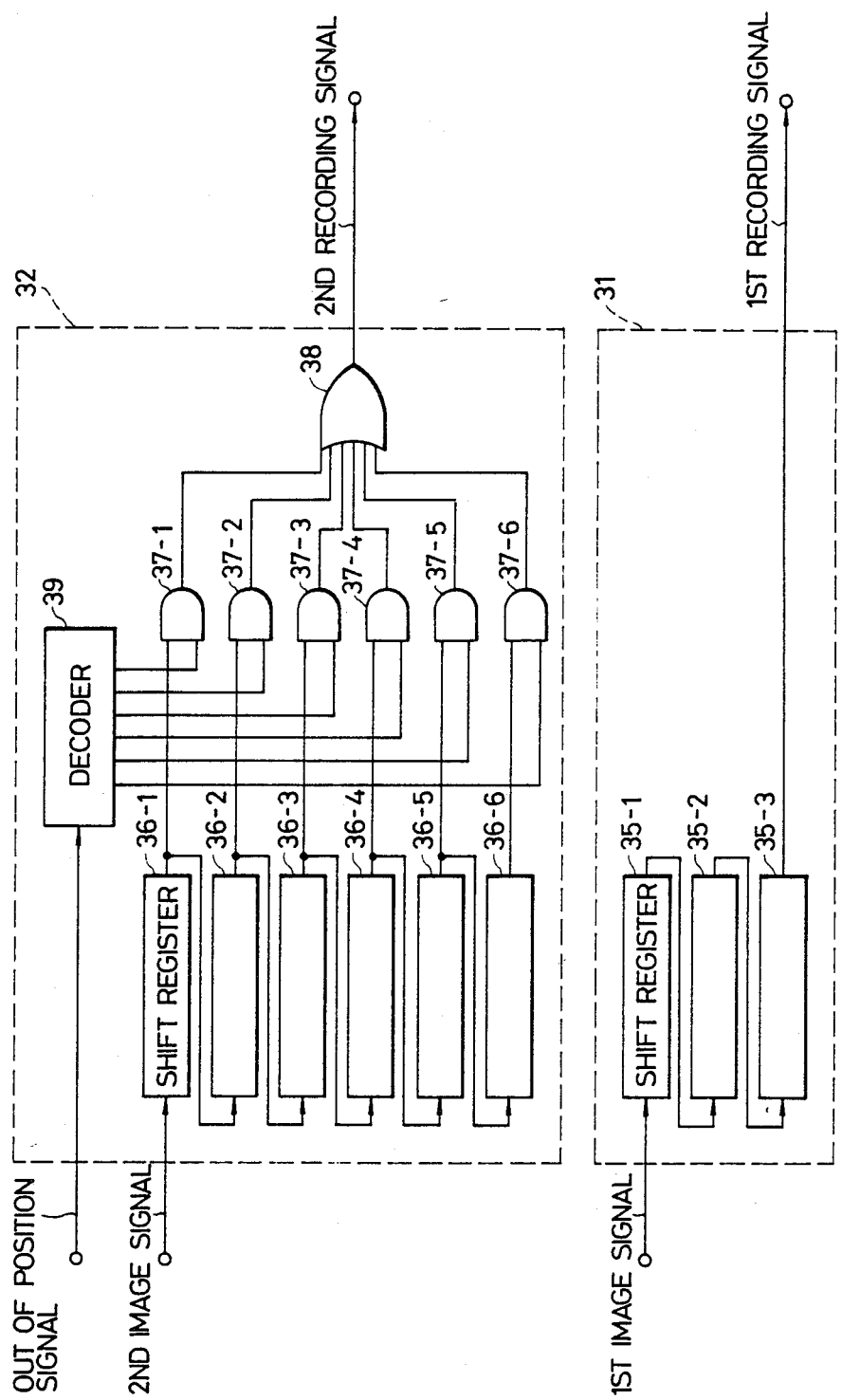
FIG. 16 is a block diagram showing delay units shown in FIG. 15.

FIG. 16 shows the details of the first and second delay units 31, 32 in the above-described circuit, wherein the first image signals used as the reference for the correction of relative aberration are supplied, in the first delay unit 31, to a serial connection of a certain number of shift registers, i.e. three shift registers 35-1-35-3 in the illustrated example, corresponding to a unit shift of a pixel required for said correction, namely the pitch of pixels in the main scanning direction X or the pitch of scanning lines in the subsidiary scanning direction Y to create a reference delay, thereby obtaining first recording signals constituting the reference for the correction. On the other hand, the second image signals, which are to be shifted relative to said reference signals, are guided, in the second delay unit 32, to a serial connection of shift registers of a doubled number, i.e. six shift registers 36-1-36-6 in the illustrated example, to create a shift from +3 to −2 units with respect to the reference signals. The output signals of said shift registers constituting said serial connection are supplied, respectively through AND gates 37-1-37-6, to an OR gate 38 to obtain second recording signals capable of achieving a delay from +3 to −2 units with respect to the first recording signals used as the reference. The out-of-position signal from the out-of-position detector 30 shown in FIG. 15 is supplied to a decoder 39 of which output terminals provide out-of-position correcting signals indicating the number of shift of units for said correction. Said output terminals are respectively connected to the other input terminals of said AND gates 37-1-37-6, whereby an AND gate connected to a shift register corresponding to the amount of shift in turn corresponding to the out-of-position signal received from time to time, thus releasing the second image signals involving a delay required for correcting the relative aberration as the second recording signals.

In practice the second image signals have to be achieved both in the directions X and Y simultaneously with respect to the first image signals used as the reference. Therefore, in order that said second image signals can be shifted to an arbitrary pixel with a correction range covering plural scanning lines, the second delay unit 32 should be provided with a group of shift registers of a capacity corresponding to pixel pitch serially connected by a number corresponding to plural pixel pitches and with a group of shift registers of a capacity corresponding to line pitch serially connected by a number corresponding to the required number of lines.

The above-described delay of the first and second image signals can not only be achieved by the shift registers as explained but can also be realized by any other delaying means such as a combination of a memory element and an input-output control circuit.

As explained in the foregoing, this embodiment is capable of detecting the direction and magnitude of the relative positional aberration in plural recording means in recording apparatus such as a color ink jet printer and of automatically correcting the relative positional relationship of the recorded image in response to the result of said detection, thereby enabling high-quality image recording without aberration in position or in colors.

The above-mentioned detection and correction may be effected at the start of power supply, or at the start of image recording, or may be effected periodically according to the time required for recording. Furthermore said correction may also be achieved through appropriate key actuations.

Furthermore this embodiment is not limited to the ink jet printer explained in the foregoing but is also applicable to other recording apparatus such as a laser beam printer.

Furthermore this embodiment is not only applicable to an apparatus provided with plural recording means as explained above but also applicable to a recording apparatus with a single recording means.

As explained in the foregoing, the present invention allows correction of the positional aberration in the image recording of the recording means, thereby avoiding aberration in the recording position or in colors and enabling high-quality image recording.

What is claimed is:

1. Color image recording apparatus comprising:
   recording means mounted for relative movement in a main scanning direction with respect to a recording medium, said recording means including a plurality of recording heads for recording on a recording medium, said recording heads being arranged along the main scanning direction with intervals between, each said recording head being adapted to record a plurality of recording elements of one color different from the respective colors of the recording elements recording elements by the other said recording heads, wherein the recording elements extend in a sub-scanning direction, substantially perpendicular to the main scanning direction, to provide a multi-color reference pattern or image;
   scanning means for relatively moving said recording means and the recording medium in the main and sub-scanning directions to record a reference pattern including recording elements of each color positioned to indicate aberrations in the positions of the recording elements in the main and sub-scanning directions;
   reading means for reading the recorded reference pattern and providing an output indicative of the relative locations of the recording elements of each color in such reference pattern;
   first detection means for providing an output indicative of the intervals between said plurality of recording heads in the main scanning direction in response to the output of said reading means;
   second detection means for providing an output indicative of the relative positions of said plurality of recording heads in the sub-scanning direction in response to the output of said reading means;
   first control means responsive to the output of said first detection means for variably controlling the positions in the main scanning direction of the recording elements provided by said recording heads to form the image; and
   second control means responsive to the output of said second detection means for variably controlling the positions in the sub-scanning direction of the recording elements provided by said recording heads to form the image.

2. Color image recording apparatus according to claim 1; wherein said first and second control means selectively control the relative positions of said recording heads.

3. Color image recording apparatus according to claim 2; wherein said first and second control means selectively control the relative positions of said recording heads in the main scanning and sub-scanning directions.

4. Color image recording apparatus according to claim 1; wherein said recording heads record in response to image signals applied thereto and said first and second control means selelctively control the relative timing with which the image signals are applied to said recoding heads.

5. Color image recording apparatus comprising:
   recording means including a plurality of recording heads for recording on a recording medium with respective different colors to form a color image in response to a recording signal;
   scanning means for scanning the recording medium with said recording means;
   reference pattern generating means for generating a recording signal representative of a color image in the form of a reference pattern to be recorded in the respective colors;
   drive means for causing the respective recording heads to record the reference pattern on the recording medium in response to the recording signal from said reference pattern generating means;
   conversion means for converting the reference pattern recorded by said recording heads into a signal having a level that varies in accordance with the colors of the recorded reference pattern to indicate the respective locations of the different colors in the recorded reference pattern;
   determining means for determining the color of the recorded image in response to the signal level provided by said conversion means;
   recognizing means responsive to said determining means for recognizing the relative positions of said recording heads; and
   control means responsive to said rocognizing means for variably controlling the relative locations at which said recording heads record the respective different colors.

6. Color image recording apparatus according to claim 5; wherein said control means selectively controls the relative positions of said recording heads.

7. Color image recording apparatus according to claim 6; wherein said control means selectively controls the relative positions of said recording heads in a main scanning direction and a sub-scanning direction substantially perpendicular to the main scanning direction.

8. Color image recording apparatus according to claim 5; wherein said control means selectively controls the relative timing of the actuation of said drive means.

9. Color image recording apparatus according to claim 5; wherein said recognizing means detents at least one of overlapping and separation of the recorded test pattern for each color in the scanning direction.

* * * * *

UNITED STATES PATENT AND TRADEMARK OFFICE
CERTIFICATE OF CORRECTION

PATENT NO. : 4,675,696

DATED : June 23, 1987

INVENTOR(S) : HIDETOSHI SUZUKI

Page 1 of 2

It is certified that error appears in the above-identified patent and that said Letters Patent is hereby corrected as shown below:

COLUMN 1

Line 20, "to for example in" should read --to, for example, in--.

COLUMN 3

Line 38, "a" should be deleted.
    Line 39, "as reference" should read --as a reference--.
    Line 43, "cessing" should read --cess--.
    Line 63, "distance" should read --distances--.

COLUMN 4

Line 62, "block" should read --blocks--.

COLUMN 6

Line 28, ", and" should be deleted.

COLUMN 7

Line 49, "head" should read --heads--.
    Line 49, "a" should be deleted.

COLUMN 9

Line 37, "between," should read --therebetween,--.
    Line 40, "elements recording elements" should read --elements recorded--.

UNITED STATES PATENT AND TRADEMARK OFFICE
CERTIFICATE OF CORRECTION

PATENT NO. : 4,675,696

DATED : June 23, 1987

INVENTOR(S) : HIDETOSHI SUZUKI

Page 2 of 2

It is certified that error appears in the above-identified patent and that said Letters Patent is hereby corrected as shown below:

COLUMN 10

Line 22, "recoding" should read --recording--.
Line 49, "rocognizing" should read --recognizing--.
Line 65, "detents" should read --detects--.

Signed and Sealed this

Seventeenth Day of November, 1987

Attest:

DONALD J. QUIGG

Attesting Officer

Commissioner of Patents and Trademarks